Aug. 25, 1942.   C. GETZ   2,294,172
PROCESS OF MAKING AERATED FOOD PRODUCTS
Filed Sept. 26, 1935
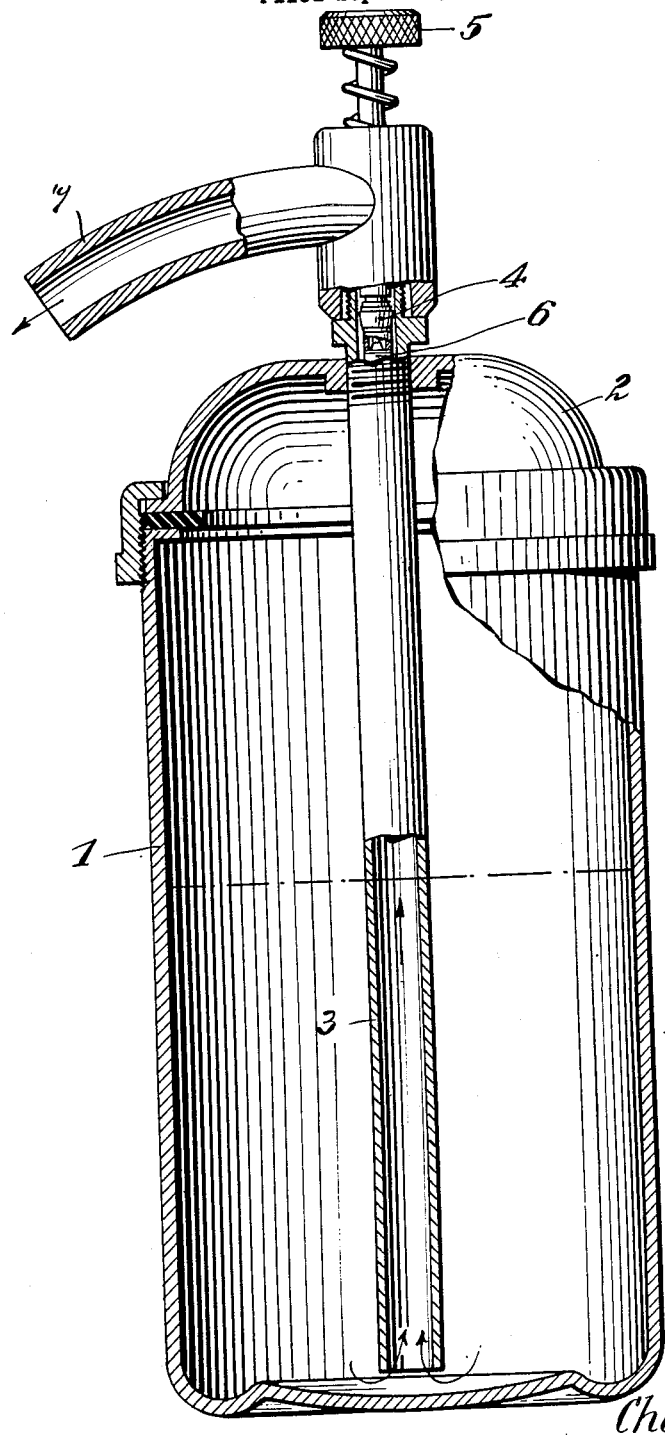
INVENTOR.
Charles Getz
BY Eedward Thomas
his ATTORNEY.

Patented Aug. 25, 1942

2,294,172

UNITED STATES PATENT OFFICE 2,294,172

PROCESS OF MAKING AERATED FOOD PRODUCTS

Charles Getz, Urbana, Ill., assignor, by mesne assignments, to Aeration Processes, Inc., Columbus, Ohio, a corporation of Ohio Application September 26, 1935, Serial No. 42,225

7 Claims. (Cl. 99—60)

This application is a continuation-in-part of my copending application Serial No. 710,236, filed February 8, 1934.

This invention relates to aerated food products and is herein described in some detail as applied to food materials containing cream.

Whipped cream, extensively sold and used in the past, usually has been made by mechanical whipping so as normally to produce a product having a volume increased by fifty per cent, or by careful attention to efficiency, increased by one hundred per cent.

Other materials, such as ice-cream mixes, mayonnaise salad dressing, tomato catsup, and beaten white of egg, have been aerated in the same way with various gases. Other people have attempted to imitate mechanical whipping by bringing together streams of liquid and aerating gas, and this latter procedure has been used to some extent.

The foregoing and other procedures have, as indicated above, been unable to produce a product having much more than twice the volume of the material before aeration. Moreover the bubbles vary in size over a wide range and the particles of butter fat visible in a microscope vary over a parallel range, making it impossible to obtain bubble films of uniform thickness, for the reason that the bubble films appear to be stabilized by, and to have their thickness measured by the butter particles, forming what has been called an armour-clad bubble.

According to the present invention a highly uniform product is obtainable having if desired a seven-fold volume, and the product may be formed in and delivered by easily handled packages in which the unaerated material and aerating gas are stored under pressure. In the form described in greatest detail, a cream-containing mixture is vigorously agitated with nitrous oxide gas under pressure so as to cause the gas to dissolve rapidly and uniformly.

The aerated product is obtained by suddenly releasing the pressure so as to produce the desired aeration. A suitable cream-containing mix with a proper gas pressure yields what is termed in ice-cream parlance an overrun of 700%, the product being about as stiff as marshmallow and "leaking" no measurable solid liquid in the space of two hours.

The accompanying drawing is a sectional side view of one form of suitable apparatus for dispensing the product of the present invention.

A pint container 1, which may be of drawn metal, has a cover 2 carrying a central tube 3 extending almost to the bottom of the container so that gas pressure on the surface of the surrounding liquid in the container tends to force the liquid out of the tube.

Normally the tube is closed by a valve 4 in its top, but a thumb-piece 5 may be depressed to unseat the plunger 6 of the valve with the result that gas pressure on the surface of the liquid forces the liquid up through the tube 3, past the valve 4, where the liquid is suddenly released from gas pressure. The liquid then flows out of the nozzle 7, and, if of suitable composition, flows out in the form of a stiff column of a sort of bubbly plastic foam.

Such a pint container containing one-half pint of 35% cream carrying 5% to 6% sugar and fifteen or twenty drops of vanilla extract and charged with nitrous oxide at 200 lbs. pressure yielded an aerated product of about 690% overrun, with no measurable drainage when standing at 40° F. for two hours.

To be certain of obtaining this result the cream had to be fresh, or at least not as much as 48 hours old. The air in the container was flushed out twice with nitrogen or nitrous oxide before charging with gas, and the container was shaken violently before releasing the pressure. Hand shaking which would be called vigorous was found to give unreliable results. It could not be counted on to yield a uniform solution of the gas in a liquid as thick as cream. Uniform and satisfactory results were obtained by shaking charged containers containing that mix for twenty seconds in the power-driven mechanical shaker described in the application of Smith Serial No. 22,441, filed May 20, 1935 and now abandoned.

It was found that similar cream mixes varying from 20.5% to 37.6% butter fat content charged, shaken and released or dispensed under identical conditions, all gave similar increases in volume. That is the overrun on all was about 125% to 140% at 40 pounds pressure of nitrous oxide and about 45% at 100 pounds pressure of nitrous oxide, and the line of observed overruns was nearly straight when plotted on coordinates between those points.

The principal observed difference in the products, aside from bubble size was the insignificant drainage in two-hour tests of cream mixes containing 29.75% or more butter fat compared with no drainage from a parallel 35% cream mix. Moreover, the leaner cream mixes were more stable against drainage when dispensed at higher pressures so as to yield a greater per cent of overrun. One 20.5% butter fat cream-mix showed about 10% drainage in two hours when dispensed at 65 lbs. pressure to show 270% overrun but only 5% when dispensed at 100 lbs. pressure to show 450% overrun.

The product of the present invention consists of bubbles of a narrow range of sizes as compared with whipped creams which are mechanically produced.

The following table shows the distribution of bubbles by sizes in typical samples of a mechanically whipped cream mix, and a cream-mix dispensed under 40 lbs. nitrous oxide pressure and a cream-mix dispensed under 60 lbs. nitrous oxide pressure, these pressures producing an aerated material representing respectively the overrun of a typical whipped cream and an overrun somewhat exceeding any obtainable by mechanical whipping cream.

| Diameter of gas bubbles in mm. | Mechanical | N₂O 40 lbs. | N₂O 60 lbs. |
|---|---|---|---|
| .01 | 25 | 1 | 0 |
| .02 | 37 | 15 | 0 |
| .03 | 39 | 48 | 8 |
| .04 | 34 | 69 | 31 |
| .05 | 26 | 44 | 41 |
| .06 | 13 | 21 | 42 |
| .07 | 8 | 5 | 46 |
| .08 | 11 | 1 | 35 |
| .09 | 11 | 0 | 21 |
| .10 | 2 | 0 | 11 |
| .11 | 4 | 0 | 3 |
| .12 | 0 | 0 | 0 |
| .13 | 7 | 0 | 0 |
| Larger up to .24 | 4 | 0 | 0 |

Often, mechanically whipped cream contains very much larger bubbles than those enumerated above, but the bubbles of the present invention consist almost exclusively of those sizes listed above or bubbles of parallel ranges of distribution of size when dispensed under other pressures.

The process of the present invention also homogenizes milk or cream to which it is applied, that is, it breaks up the larger fat globules into smaller particles, often beyond the limit of visibility in a microscope.

A sample of 35% cream saturated with nitrous oxide at a pressure of 80 lbs. to the square inch was dispensed by sudden release of pressure into a fifty per cent solution of glycerine, to dilute it and reduce the Brownian movement which was found to make satisfactory microscopic examination impossible. Another unaerated sample of the same cream (that is free from nitrous oxide) was similarly diluted in a similar glycerine solution.

Both samples were examined under the microscope and the globules of fat counted typical fields in each with the following results:

| Size in microns | N₂O treated | Ordinary cream |
|---|---|---|
| Less than 1.8 | 16 | 16 |
| 1.8 to 3.6 | 6 | 7 |
| 3.6 to 5.4 | 0.5 | 6.6 |
| Over 5.4 | 0.2 | 0.6 |

When skim milk was substituted for the glycerine solution and used as a diluent in the ratio of 1000 to 1, the same kind of results were obtained, as follows:

| Size in microns | N₂O treated | Ordinary cream |
|---|---|---|
| 1.8 to 3.6 | 8 | 27 |
| 3.6 to 5.4 | 1.1 | 10 |
| Over 5.4 | 0.7 | 1.2 |

Other counts showed that these results were typical of many counts.

Photographs of air bubbles taken at 30 magnifications of mechanically whipped showed the larger bubbles were decidedly irregular in shape, and, moreover, showed many large bubbles of various sizes scattered among the small round bubbles. It seems likely that mechanical whipping causes small bubbles to tend to cling to large ones and also causes colliding small bubbles to burst and form large ones, whereas the procedure of the present invention seems to create almost exclusively bubbles of a narrow range of size, that size range varying with the "overrun" of any given cream.

Parallel results in many respects were obtained when the non-acid forming gases, acetylene, or dimethyl oxide, or di-flour-dichlormethane, or when carbon dioxide were substituted for nitrous oxide.

Carbon dioxide, which reacts with water to form free carbonic acid, was open to the objection it gives a sharp and, to many people, an unpleasant taste to cream. It has been found that mixtures in which the cream content is pasteurized cream may be commercially used for producing the aerated products with nitrous oxide gas under pressure as the aerating agent. Nitrous oxide which is non-acid forming and which is an inert gas under the conditions of use also yields satisfactory aerated products in which the cream content is homogenized cream, although homogenized cream cannot be mechanically whipped. Dimethyl oxide and di-fluor-dichlormethane were similarly non-acid forming and inert under the conditions of use although very soluble in water.

It is found that the nitrous-oxide aerated cream dispensed into cold water by sudden release of pressure yields butter.

A mixture suitable for mayonnaise salad was made by mixing without whipping: 1 egg, ½ teaspoon dry mustard, ½ teaspoon salt, 1 teaspoon powdered sugar, ¼ teaspoon paprika, ¾ teaspoon lemon juice, ¾ teaspoon vinegar, 2 cups salad oil, 1 tablespoon water.

The foregoing mixture (240 cc.) charged with nitrous oxide at 85 pounds per square inch and dispensed by suddenly releasing the pressure yielded 675 cc. of product or 180% overrun.

240 cc. of the same mixture with the further addition of half its volume of 35% cream, similarly dispensed yielded 900 cc. of product or 310% overrun.

240 cc. of the same salad dressing mixture with the further addition of its own volume of the same cream yielded 750 cc. of product or 210% overrun.

240 cc. of a commercial tomato catsup charged with nitrous oxide at 85 pounds per square inch similarly dispensed delivered 475 cc. of product or almost 100% overrun.

180 cc. white of egg, the product of six eggs, mixed with 3 teaspoons of sugar and 1 teaspoon of commercial extract of vanilla charged to the same pressure with nitrous oxide and similarly dispensed yielded 450 cc. of product, or 150% overrun.

Having thus described certain embodiments of the invention, what is claimed is:

1. The process of producing an aerated product which consists in causing an edible fat-containing liquid to absorb inert water-soluble non-acid forming gas under pressure of between 25 and 200 pounds per square inch and suddenly releasing the pressure.

2. The process of producing an aerated product which consists in causing a liquid carrying cream to absorb nitrous oxide under a pressure of upwards of twenty-five pounds and less than two hundred pounds to the square inch and suddenly releasing the pressure.

3. The process of producing an aerated product which consists in causing an edible fat-containing liquid to absorb nitrous oxide under pressure and suddenly releasing the pressure so as to yield a highly aerated foamy product.

4. The process of producing an aerated cream which consists in dissolving a quantity of nitrous oxide under pressure in a liquid carrying cream and thereafter releasing the pressure simultaneously therewith forming a product having the consistency of whipped cream.

5. The process of producing an aerated product which consists in suddenly releasing the pressure holding nitrous oxide in solution in a liquid edible fat-containing product so as to yield a highly aerated bubbly plastic foam product, said pressure being between 25 and 200 pounds per square inch.

6. The process of producing an aerated food product which consists in causing an edible fat-containing liquid to absorb nitrous oxide under pressure, and thereafter releasing the pressure and simultaneously therewith forming a highly aerated foamy product.

7. The process of producing an aerated food product which consists in causing an edible fat-containing liquid to absorb under pressure a gas of the class consisting of nitrous oxide, dimethyl oxide and difluordichlormethane, and thereafter releasing the pressure and simultaneously therewith forming a highly aerated foamy product.

CHARLES GETZ.